United States Patent
McBain (10) Patent No.: US 6,863,981 B2
(45) Date of Patent: Mar. 8, 2005

(54) IN-MOLD APPEARANCE COATINGS FOR NYLON AND NYLON BASED THERMOPLASTIC SUBSTRATES

(75) Inventor: Douglas S. McBain, Wadsworth, OH (US)

(73) Assignee: Omnova Solutions Inc., Fairlawn, OH (US)

( * ) Notice: Subject to any disclaimer, the term of this patent is extended or adjusted under 35 U.S.C. 154(b) by 264 days.

(21) Appl. No.: 10/161,125

(22) Filed: May 31, 2002

(65) Prior Publication Data

US 2003/0224189 A1 Dec. 4, 2003

(51) Int. Cl.$^7$ ............................................... B32B 27/36
(52) U.S. Cl. ...................... 428/412; 428/172; 428/192; 264/328.1
(58) Field of Search ........................ 264/328.1; 428/172, 428/412

(56) References Cited

U.S. PATENT DOCUMENTS

| | | |
|---|---|---|
| 4,189,517 A | 2/1980 | Shanoski et al. |
| 4,222,929 A | 9/1980 | Shanoski et al. |
| 4,331,735 A | 5/1982 | Shanoski |
| 4,414,173 A | 11/1983 | Cobbledick et al. |
| 4,508,785 A | 4/1985 | Cobbledick et al. |
| 4,668,460 A | 5/1987 | Onega |
| 5,084,353 A | 1/1992 | Cobbledick et al. |
| 5,132,052 A | 7/1992 | Cobbledick et al. |
| 5,658,672 A | 8/1997 | Lenke et al. |
| 5,777,053 A | 7/1998 | McBain et al. |
| 5,902,534 A | 5/1999 | Fujishiro et al. |
| 6,136,383 A | 10/2000 | Schwartz et al. |

*Primary Examiner*—Terressa Boykin
(74) *Attorney, Agent, or Firm*—Fay, Sharpe, Fagan, Minnich & McKee, LLP; David G. Burleson (57) ABSTRACT

An in-mold coating composition particularly useful for in-mold coating of molded nylon based substrates comprises a coreactive addition polymerizable composition of urethane-acrylate oligomer having at least two acrylate and/or methacrylate terminal groups, at least 0.2% of a sulfonic acid functional acrylate or methacrylate, at least 0.2% of acrylic and/or methacrylic acid, with the balance being coreactive polymerizable diacrylate(s) and/or ethylenically unsaturated monomer(s).

55 Claims, 2 Drawing Sheets

FIG.-1

IN-MOLD APPEARANCE COATINGS FOR NYLON AND NYLON BASED THERMOPLASTIC SUBSTRATES

FIELD OF THE INVENTION

The invention pertains to in-mold coatings for thermoplastic substrates and more particularly to reactive urethane-acrylates copolymerizable with other ethylenically unsaturated components to provide a thermosetting in-mold appearance surface coating for thermoplastic nylon or modified nylon substrates.

BACKGROUND OF THE INVENTION

Thermoplastic substrates ordinarily are based on converting thermoplastic resins, powders, granules, pellets and similar forms of thermoplastic resinous material under heat and pressure to form useful molded articles. Injection molding processes for molding thermoplastic resinous materials typically comprise heating the molding compound to form a viscous flowable melt, injecting the heated melt under high pressure into a relatively cool closed mold cavity, cooling the melt to form a solid shape molded substrate conforming to the interior configuration of the mold cavity, and then ejecting the molded part from the mold cavity. Ordinarily, the compounded molding resin flows under pressure into a heated mold to conform to the shape of the mold cavity. The mold is closed and the heat and pressure is maintained for sufficient dwell time to fully form the intended plastic article. The mold and formed plastic article are cooled to harden the molded plastic article, whereupon the mold can be opened and the molded article removed. In thermoplastic molding processes, the molded part can be a finished article having a wide variety of design details such as bosses, flanges, ribs, bushings, holes or other openings, various functional structures, decorative designs, and flat surfaces. Most molded substrates need to be surface coated, particularly for appearance purposes, and require good adhesion to the applied surface coating. However, many desirable decorative and/or protective surface coatings are difficult to adhere directly to thermoplastic substrates, especially to nylon and modified nylon substrates.

In-mold coatings typically are sprayed into the mold cavity to coat the interior mold surfaces during the molding process to provide a surface coating integrally fused or adhered to the thermoplastic substrate being injection molded. In-mold coatings have been found to be particularly advantageous for molded substrates to provide a useful surface treatment to the molded substrates. In-mold coatings avoid surface imperfections in the molded part such as surface porosity, sink marks, surface waviness, and similar surface defects and imperfections, which frequently require additional labor and costs to rework and post finish. An in-mold coating can be injected into a slightly opened mold or injected under pressure into a closed mold. The in-mold coating is applied to the mold cavity surfaces and/or applied over a molded or partially molded substrate, and then heat cured in the mold under pressure to form a thermoset surface coating integrally fused on the molded substrate. An in-mold coating can be injected into the mold after the mold pressure is released and while the mold is opened infinitesimally to permit injection of the in-mold coating into the mold cavity. For instance, U.S. Pat. No. 5,902,534 discloses a method of injecting molding resin into a mold, followed by injecting an in-mold coating into the mold cavity between the molded substrate and the mold cavity surfaces, compressing and curing the in-mold coating while in contact with the mold cavity surface, and then cooling the coated molded substrate to provide interface adherence of the cured in-mold coating to the molded substrate surface. Similarly, U.S. Pat. No. 4,668,460 suggests a method of in-mold coating a molded substrate contained within a closed mold by first molding the substrate under pressure and then injecting an in-mold coating into the closed mold at a pressure higher than the molding pressure. In-mold coatings are primarily directed to producing smooth surfaces free of surface defects and imperfections.

In-mold polymeric urethane-acrylate coatings containing copolymerizable acrylates and/or ethylenically unsaturated monomers are disclosed in U.S. Pat. No. 4,189,517, No. 4,222,929, No. 4,331,735, No. 4,414,173, No. 4,508,785, No. 5,084,353, No. 5,132,052, No. 5,658,672, and No. 5,777,053.

It now has been found that an in-mold appearance surface coating comprising an urethane acrylate oligomer adapted to addition copolymerize with other ethylenically unsaturated components, including minor amounts of a sulfonic acid functional acrylate monomer and an acrylic acid monomer selected from acrylic, methacrylic or ethacrylic acids, provides an improved in-mold surface coating with excellent adhesion to difficult adhesion substrates, such as thermoplastic nylon and modified thermoplastic nylon. The cured in-mold surface coating produces a finished appearance free of surface defects and imperfections and avoids costly refinishing or reworking of the molded parts. These and other advantages of this invention will become more apparent by referring to the detailed description of the invention and the illustrative examples herein.

SUMMARY OF THE INVENTION

Briefly, the invention pertains to thermosetting in-mold appearance surface coatings for injection molded thermoplastic substrates, especially nylon and modified nylon substrates, to provide molded thermoplastic substrates with a cured in-mold finished appearance coating integrally fused or adhered to the surface of the thermoplastic molded substrate. The in-mold coating of this invention is a copolymerizable mixture comprising by weight from about 10% to about 50% low molecular weight urethane acrylic oligomer having terminal acrylate groups and a number average molecular weight from about 500 to about 8000 measured by GPC, at least about 0.2% of a sulfonic acid functional acrylate monomer, with at least about 0.2% of an acrylic acid monomer, and the balance being a copolymerizable diacrylate and/or copolymerizable monoethylenically unsaturated monomer, where the in-mold surface coating is adapted to addition copolymerize cure upon heating. The in-mold coating is injected into the mold cavity after the thermoplastic substrate molding composition is at least partially set, and then cured under heat and pressure to become an integrally fused finished appearance surface coating adhered to the molded thermoplastic substrate surface.

DETAILED DESCRIPTION OF THE INVENTION

The in-mold appearance coating composition of this invention is based on a thermosetting copolymerizable composition comprising an urethane acrylate oligomer, a sulfonic acid functional acrylate monomer, and an acrylic acid monomer, with the balance being a copolymerizable diacrylate and/or copolymerizable monoethylenically unsaturated monomer, where mixtures of diacrylate and monomer are preferred.

Referring first to the urethane-acrylate oligomer, the acrylate functionally reactive oligomer is an acrylate or methacrylate terminated low molecular weight urethane intermediate. The preferred urethane intermediate comprises the reaction product of excess equivalents of isocyanate, preferably a diisocyanate, reacted with lesser equivalents of polyol, preferably a diol, to produce an isocyanate terminated low molecular weight linear urethane intermediate. The urethane intermediate is further reacted with an hydroxyl alkyl acrylate to produce the acrylate functional oligomer having terminal acrylate or methacrylate double bonds.

Useful dihydroxy reactants for forming the preferred linear urethane intermediate ordinarily are low molecular weight hydroxyl terminated polyethers commonly known as polyether diols or hydroxyl terminated polyesters commonly known as polyester diols. Polyester diols are preferred for coatings requiring weatherability. Hydroxyl functional polyethers are derived from cyclic ethers and comprise polyether diols including polyoxypropylene diols, polyoxyethylene diols, and poly(oxyethylene-oxypropylene) diols, where equivalent triols are useful but minimized to produce a predominantly linear urethane intermediate. Hydroxyl functional polyesters are preferably linear polyester diols comprising the esterification of primarily lower glycols with aromatic and/or aliphatic dicarboxylic acids. Useful glycols include ethylene glycol, propylene glycol, butane diols, pentane diols, hexane diols, neopentyl glycol, dodecanediol, diethylene glycol, dipropylene glycol, and similar short chain diols. Minimal polyols can be used including glycerol, trimethylol ethane or propane, and pentaerythritol, if desired. Useful dicarboxylic acids for esterification with diols and polyols include phthalic acid or anhydride, isophthalic acid, terephthalic acid, and similar aromatic dicarboxylic acids, while useful linear aliphatic dicarboxylic acids have from 1 to about 10 carbon atoms, or higher, including for example, malonic, succinic, glutaric, adipic, pimelic, suberic, azelaic, and sebacic acids. Where weatherability is required, aromatic dicarboxylic acids are ordinarily avoided. Excess equivalents of diol are reacted with lesser equivalents of dicarboxylic acid to provide essentially an hydroxyl terminated linear polyester diol. Polyester derived urethane-acrylate oligomers are preferred.

The aforesaid hydroxyl terminated polyethers or polyesters, preferably oligomeric diols, are further reacted with excess equivalents of isocyanate, preferably diisocyanate, to provide a low molecular weight isocyanate terminated urethane intermediate. Useful diisocyanates include for example hexamethylene diisocyanates, 2,2,4- and/or 2,4,4-trimethyl hexamethyllene diisocyanate, p- and m-tetraethyl diisocyanate, methylene bis(4-cyclohexyl diisocyanate known as hydrogenated MDI, 4,4-methylene diphenyl diisocyanate known as MDI, p- and m-phenylene diisocyanate, 2,4- and/or 2,6-toluene diisocyanate known as TDI, and isophorone diisocyanate known as IPDI, 1,5 naphthalene diisocyanate, ethylene or propylene diisocyanate, 1,4-dimethyl cyclohexane diphenylmethane diisocyanate, and similar diisocyanates, or mixtures of such diisocyanates. Minimal amounts of triisocyanate can be used, but are not preferred, since a linear urethane intermediate is preferred. The urethane intermediate is a low molecular weight linear isocyanate terminated oligomer having a number average molecular weight from about 200 to about 7000, and preferably from about 300 to about 3000 as measured by GPC. Urethane forming reactions of diisocyanates with a polyether or polyester diol at temperatures typically from about 125 to about 210° C. or higher, and preferably from about 140 to about 175° C.

The isocyanate terminated urethane intermediate is further reacted with an hydroxyl alkyl acrylate or methacrylate to form acrylate or methacrylate terminal double bonds on both ends of the linear urethane intermediate, where linear diacrylates or dimethacrylates are preferred. Useful hydroxyl acrylates and methacrylates include for example hydroxyethyl, hydroxypropyl, hydroxybutyl, hydroxypentyl, hydroxyhexyl, hydroxyoctyl, and similar hydroxy lower alkyl acrylates and methacrylates. Hydroxyl lower alkylacrylates are preferred to produce preferred diacrylate. The resulting acrylate (preferred) or methacrylate terminated urethane oligomers have a number average molecular weight from about 500 to about 8,000, and preferably from about 500 to about 4,000, as measured by GPC. On a weight basis, the in-mold coating comprises from about 10% to about 50% of the urethane-acrylate oligomer.

A less preferred urethane-acrylate oligomer is an acrylic or methacrylic ester linked urethane intermediate comprising acrylic or methacrylic acid esterified with an hydroxyl terminated linear urethane intermediate to form an ester linked urethane acrylate oligomer. An hydroxyl terminated urethane intermediate comprises reaction of excess equivalents of a polyether or polyester diol with lesser equivalents of a diisocyanate to form an hydroxyl terminated linear urethane intermediate. The hydroxyl terminated intermediate is further reacted with excess equivalents of acrylic, methacrylic, or ethacrylic acid to provide an ester link acrylic, methacrylic, or ethacrylic terminated urethane oligomer, where diacrylate-urethanes are preferred.

In accordance with this invention, good adhesion of the in-mold coating to nylon and modified nylon substrates was surprisingly found to be dependant upon inclusion in the copolymerizable in-mold coating of an effective amount of copolymerizable alkylsulfonic acid acrylate or methacrylate monomer. The sulfonic acid functional monomer comprises an acrylate or methacrylate linear or branched low alkylsulfonic acid monomer terminated with a sulfonic acid group. Preferred sulfonic acid functional monomers comprise alkylsulfonic acid amido acrylate or methacrylate monomers. The preferred sulfonic acid functional monomer comprises acrylic or methacrylic acid reacted with the amine group of a sulfonic acid terminated alkyl amine such as methylamine, ethylamine, n-propylamine or isopropylamine, n-butyamine, n-amylamine, isoamylamine, n-octylamine, n-decylamine, and similar linear or branched alkyl amines. The preferred sulfonic acid terminated alkyl amido acrylate or methacrylate monomer is 2-acrylamido-2-methylpropanesulfonic acid, commercially known as AMPS® monomer sold by Lubrizol. Particularly good adhesion to nylon and modified nylon substrates is obtained by including at least about 0.2%, desirably from about 0.2% to about 5%, and preferably from about 0.5 to about 2%, of sulfonic acid functional monomer based on the weight of thermosetting copolymerizable components in the in-mold coating composition of this invention. Based upon 100 parts by weight of the urethane acrylate, the amount of the alkylsulfonic acid amido acrylate is from about 0.25 to about 6, and preferably from about 0.5 or about 1.0 to about 2 or about 4 parts by weight.

A surprising aspect of this invention is that sulfonic acid functional amido acrylate or methacrylate monomer is not particularly effective as an adhesion promoter except in combination with a minor amount of a copolymerizable acrylic acid monomer. In accordance with this invention, the in-mold coating further contains a minor amount of a copolymerizable acrylic acid monomer selected from acrylic acid, methacrylic acid, ethacrylic acid, or other low alkyl substituted acrylic acid, or mixtures of such monomers. The inclusion of an acrylic acid monomer component in combination with the sulfonic acid functional monomer has been found to be particularly effective in providing adhesion to particularly difficult adherent thermoplastic substrates such as nylon and modified nylon. The preferred acrylic acid monomer is methacrylic acid. On a weight basis, the copolymerizable in-mold primer coating composition comprises at least about 0.2%, desirably from about 0.2 to about 5%, and preferably from about 0.5% to about 2% of a copolymerizable acrylic acid monomer component. Based upon 100 parts by weight of the urethane acrylate, the amount of the acid monomer is from about 1 to about 8, and preferably from about 1.5 or about 2 to about 4 or about 6 parts by weight.

Accordingly, the in-mold appearance coating of this invention is a copolymerizable mixture comprising by weight at least about 10% low molecular weight urethane acrylate oligomer, at least about 0.2% of a sulfonic acid functional acrylate monomer, and at least about 0.2% of an acrylic acid monomer or monomers selected from acrylic, methacrylic or ethacrylic acid, with the balance being a copolymerizable diacrylate and/or a copolymerizable monoethylenically unsaturated monomer, where mixtures of diacrylate and monoethylenically unsaturated monomer are preferred.

In this invention, a preferred component of the thermosetting in-mold coating composition is a copolymerizable linear acrylate ester comprising an acrylic, methacrylic or ethacrylic acid ester of an alkyl, an ether, or a polyether diol, triol, or higher polyol to provide a diacrylate or triacrylate or higher acrylate ester. Diacrylate esters of an alkyl diol are preferred. Useful alkyl diols comprise from 2 to about 30 alkyl carbon atoms, preferably from 2 to about 10 carbon atoms, including alkylene and branched alkyl diols such as ethylene glycol, propylene glycol, butylene glycols, pentane diol, neopentyl glycol, 1,6 hexane diol, and similar lower alkyl diols, where preferred alkylene diols are neopentyl and hexane glycols. Useful alkyl polyols include alkyl triols such as trimethylol ethane and propane, butane triol, and hexane triol, but used minimally if used. Polyacrylate esters of higher polyols such as pentaerythritol are possible but seldom are used. Useful alkyl ether glycols include diethylene glycol, dipropylene glycol, and triethylene glycol, and similar lower alkyl ether diols. Preferred ether diols are diethylene and dipropylene glycols. Useful polyether diols include for example low molecular weight polyethylene or polypropylene or poly(ethylene propylene) linear diols. Acrylate esters are formed from the foregoing diols and triols by esterification of the respective diol and triol with an acrylic acid selected from acrylic acid, methacrylic acid, ethacrylic acid, or similar low alkyl substituted acrylic acid. On a weight basis, the preferred copolymerizable in-mold coating composition of this invention comprises from about 10 to about 40 and preferably from about 15 to about 30 weight parts of a diacrylate ester of diol, based on 100 weight parts of the urethane acrylate. One or more diacrylate esters can be used in the in-mold coating.

In a preferred aspect of this invention, a preferred component of the in-mold coating composition comprises a copolymerizable hydroxy alkyl acrylate. Useful hydroxy alkyl acrylates comprise alkyl acrylates and methacrylates where the alkyl group contains from 1 to about 10, and preferably from 1 to about 5, carbon atoms, and one end of the alkyl chain is terminated with an acrylate or methacrylate group. Useful alkyl groups include for instance methyl, ethyl, propyl, butyl, and higher alkyl groups where propyl is the preferred alkyl chain. Hydroxy alkyl acrylates and/or methacrylates comprise above about 5 weight parts and preferably from about 5 to about 15 or about 25 weight parts based on 100 weight parts of the urethane-acrylate oligomer.

In a further preferred aspect of this invention, a preferred component of the in-mold appearance coating composition of this invention is isobornyl acrylate or methacrylate. On a weight basis, the in-mold coating comprises desirably above about 30 weight parts and preferably from about 30 to about 50 or about 80 weight parts isobornyl acrylate or methacrylate based on 100 weight parts of urethane acrylate oligomer.

In a further preferred aspect of this invention, a copolymerizable component of the thermosetting in-mold coating composition of this invention comprises a vinyl substituted aromatic hydrocarbon including for example styrene, lower alky substituted styrenes such as alpha methyl and ethyl styrenes, vinyl toluene, halo substituted styrenes such as alpha-chloro styrene, and similar mono-vinyl aromatic monomers. On a weight basis, the copolymerizable in-mold primer coating composition of this invention contains from about 20 to about 60 or about 80, and preferably from about 30 to about 50 weight parts of copolymerizable vinyl aromatic monomer per 100 weight parts urethane-acrylate oligomer.

In accordance with the most preferred aspects of this invention, the in-mold appearance coating is a copolymerizable mixture comprising by weight:

from about 10% to about 50% and preferably from 20% to about 40% low molecular weight urethane acrylate oligomer having terminal acrylate or methacrylate groups;

from about 0.2% to about 5% and preferably from about 0.5% to about 2% sulfonic acid functional acrylate or methacrylate monomer;

from about 0.2% to about 5% and preferably from about 0.5% to about 2% of an acrylic acid monomer or monomers;

from about 5% to about 20% and preferably from about 5% to about 15% of an acrylate or methacrylate diester of a diol;

from about 1% to about 15% and preferably from about 2% to about 10% of an hydroxyl acrylate or methacrylate;

from about 10% to about 40% and preferably from about 20% to about 30% of an isobornyl acrylate or methacrylate; and from about 1% to about 30% and preferably from about 10% to about 20% of a vinyl aromatic monomer.

The in-mold appearance coating of this invention can contain minor amounts of other copolymerizable monoethylenically unsaturated alkyl or alicyclic monomer having a carbon to carbon double bond unsaturation including vinyl monomers, acrylic monomers, allylic monomers, acrylamide monomers, and unsaturated monocyclic hydrocarbon monomers. Useful vinyl monomers include vinyl esters such as vinyl acetate, vinyl propionate, vinyl butyrates, vinyl benzoates, vinyl isopropyl acetates and similar vinyl alkyl esters, and vinyl alicyclic monomers such as cyclohexane. Useful acrylic monomers include lower alkyl esters of acrylic or methacrylic acid having an alkyl ester chain from 1 to about 12 carbon atoms as well as aromatic derivatives of acrylic and methacrylic acid. Useful acrylic monomers include for instance, methyl, ethyl, propyl, butyl, 2-ethyl hexyl, cylcohelyl, decyl, isodecyl, benyl and similar lower alkyl or cyclic esters of acrylic or methacrylic acid. Useful acrylamide monomers include lower alkyl acrylamide or methacrylamide monomers having lower alkyl groups such as methyl, ethyl, propyl, n-butyl or iso-butyl alkyl groups including N-alkoxymethyl derivatives such as for example N-methylol, N-ethanol acrylamides or methacrylamides. On a weight basis, the in-mold coating can contain from 0 to about 20 weight parts and preferably from about 0 to about 10 weight parts of such other mono-ethylenically unsaturated alky or acrylic copolymerizable monomer based on 100 weight parts of urethane acrylate oligomer.

The preferred in-mold primer coating of this invention comprises an urethane acrylate oligomer, a linear acrylate ester of a diol or triol, an hydroxyl alkyl acrylate, an isobornyl acrylate or methacrylate monomer, a vinyl aromatic monomer, a sulfonic acid functional amido acrylate monomer, and an acrylic acid monomer component, where the term acrylate includes methacrylate, and the coating is an addition copolymerizable mixture adapted to cure and thermoset under heat in the presence of a free radical initiator such as peroxide. Useful peroxides include t-butyl peroxide, t-butyl perbenzoate, t-butyl peroctate, dibenzoyl peroxide, methyl ethyl ketone peroxide, diacetyl peroxide, t-butyl hydroperoxide, ditertiary butyl peroxide, benzoyl peroxide, t-butyl peroxypivalate, 2,4-dichlorobenzoyl peroxide, decanoylperoxide, propionyl peroxide, hydroxyheptyl peroxide, cyclohexanone peroxide, dicumyl peroxide, cumene hydroperoxide, and similar free radical peroxide initiators. Azo free radical initiators can be useful including for instance azo bis-isobutyronitrile, dimethyl azobis-isobutyrate, and similar azo free radical initiators. A preferred initiator is t-butyl perbenzoate. Free radical peroxide or azo initiators are added to the copolymerizable in-mold coating at a level above about 0.5%, desirably from about 1 to about 5%, and preferably from about 1% to about 2%, by weight based on the weight of the copolymerizable thermosetting components of the in-mold coating composition of this invention.

In conjunction with the free radical initiator, an accelerator can be added, if desired to accelerate curing, including cobalt driers such as cobalt naphthenate or octoate, or other metal naphthenates such as zinc, lead, and manganese naphthenates, or mixtures of such accelerators. Ordinarily minimal amounts of accelerator are used, if desired, at levels from about 0.01% to about 1%, preferably from about 0.01% to about 0.5%, based on the weight of the copolymerizable thermosetting components in the in-mold coating composition. Conversely, inhibiters can be added to control and delay cure times, if desired, such as benzoquinone, hydroquinone, and methoxyhydroquinone. Inhibiters if used are added at very low levels, typically less than 0.1%, to delay and properly control the copolymerization rate of the in-mold coating.

The in-mold copolymerizable thermosetting in-mold coating composition can be compounded with other additives, as desired, such as opacifying pigments, tinting pigments or colorants, and inert fillers. Useful opacifying pigments include titanium dioxide, zinc oxide, titanium calcium, while tinting pigments include a variety of oxides, chromium, cadmium, and other tinters. Useful fillers include clays, silicas, talc, mica, wood flower, barium sulfate, calcium and magnesium silicates, aluminum hydroxide, barium sulfate, and magnesium and calcium carbonates. Opacifying pigments, tinting pigments or colorants, and inert fillers can be used at a level from about 5 to about 30 weight parts per 100 weight parts of copolymerizable components in in-mold coating compositions. The in-mold coating can be an opacified, tinted, opaque, or a clear appearance in-mold coating.

Other additives to the in-mold coating can include lubricants and mold release agents such as zinc or calcium stearate, phosphoric acid esters, and zinc salts of fatty acids. Mold release agents can be used to control the cure rate, where zinc fatty acids tend to moderately accelerate the cure time, while calcium fatty acids tend to moderately reduce the cure time. A low profile additive, such as polyvinyl acetate, can be added if desired to avoid molding shrinkage of the in-mold coating.

The thermosetting in-mold appearance coating composition of this invention can be prepared by mixing together the urethane acrylate oligomer, the linear acrylate ester, the hydroxy alkyl acrylate, the vinyl substituted aromatic monomer, the sulfonic acid functional amido acrylate monomer, and the acrylic acid monomer component, where acrylate includes methacrylates, to form a uniform fluid resinous blend. The free radical initiator can be added to the resinous mixture, or added with one of the resinous components such as the aromatic vinyl monomer, along with accelerator if any, and inhibiter if any. Other compounding ingredients of pigments, colorants, fillers, and other additives can be added as desired and mixed to form a uniformly compounded in-mold coating.

Referring now to useful thermoplastic substrates, the thermosetting in-mold appearance coating compositions of this invention are particularly suitable for obtaining good adhesion over a thermoplastic nylon based substrate, including modified nylon, nylon alloys, and nylon mixed with other thermoplastic polymers. Nylon thermoplastics are polyamides comprising recurring amide groups on the main polymer chain and ordinarily are produced by reaction of a dicarboxylic acid having from 4 to about 15 carbon atoms with a diamine having from 4 to about 15 carbon atoms, such as, condensation reaction of a linear diamine with a linear dicarboxylic acid to produce an aliphatic nylon, or inter condensation of bifunctional monomers of an amine containing dicarboxylic acid such as 6-aminohexanoic acid, or addition polymerization of cyclic lactams having from 4 to about 20 carbon atoms, such as e-caprolactam, 2-pyrrolidinone, or aminobutyrolactam, to produce the Nylon thermoplastic. Suitable dicarboxylic acids include succinic acid, adipic acid, azelaic acid, and sebacic acid, dodecanedioic acid, or higher linear dicarboxylic acids if desired. Aromatic polyamides comprise aromatic dicarboxylic acids reacted with aromatic diamine, while an aliphatic-aromatic polyamide comprises an aromatic reactant co-reacted with an aliphatic reactant.

Nylon based thermoplastic substrates comprising modified nylon, polymeric blends, alloys, and similar modified nylons containing other thermoplastic polymers and/or modifiers, can be useful nylon based thermoplastic substrates on which the thermosetting in-mold coating of this invention achieves good substrate adhesion. Useful nylon blends or alloys include nylon combined with other polymers such as polycarbonate. A compatibilizer copolymer compatible with nylon and the modifying thermoplastic may be necessary to obtain miscibility. Such modified nylons ordinarily comprise major amounts of nylon with lesser amounts of modifying thermoplastic polymer where modified nylon comprises from about 40 to about 90 weight percent nylon with the balance being modifying thermoplastic polymer or polymers, such as polycarbonate or polyester.

Additives to nylons and modified nylons can include, as desired, tinting pigments, colorants, heat stabilizers, impact modifiers, lubricants, mold release agents, UV stabilizers, plasticizers, fibers, reinforcing materials, fillers, and other additives ordinarily added to injection molding thermoplastic substrate compounding resins to form injection molding compounds.

Injection molding processes involve heating the thermoplastic substrate resinous compounding composition to a temperature above the melting point of the compounding resin and injecting the heated resin melt into an injection mold cavity for molding a substrate part or article. The substrate resinous molding compound ordinarily is injected into the cavity of an injection mold and molded under heat and pressure to at least partially set the thermoplastic molding resin and form a molded substrate. Substrate molding temperatures typically are from about 100 to about 300° F. and preferably from about 150 to about 250° F. During the molding and cooling stage, the injection molding pressure preferably is partially released from the mold to permit injection of the in-mold appearance coating of this invention into the minimally opened mold under reduced low pressure. Alternatively, the substrate molding compound can be injection molded under high pressure followed by injecting the in-mold coating at a higher pressure into the mold maintained closed under pressure A metered amount of the in-mold coating containing initiator, additives, and other compounding ingredients as desired is injected into a nozzle located within the parting line of the mold cavity and preferably disposed opposite from the thermoplastic substrate injection sprues. Pressure can be applied as needed and ordinarily can be from about 2,000 to about 5,000 psi, and preferably from about 3,000 to about 4,000 psi, but ordinarily at a pressure considerably less than the pressure applied while molding the substrate resinous compound. The applied pressure can increase as the in-mold appearance coating is injected between the partially molded substrate and the mold cavity surfaces. The in-mold coating is heat cured to addition copolymerize the urethane acrylate oligomer, linear acrylate ester, the hydroxy alkyl acrylate, the isobornyl monomer, the vinyl aromatic monomer, the sulfonic acid functional acrylate monomer, and the acrylic acid monomer to form a fully cured in-mold appearance surface coating advantageously molded integrally with and fusion adhered to the fully formed thermoplastic substrate. In-mold coating curing temperatures can be from about 150 to about 300° F. for time sufficient to fully cure the in-mold coating. The heat curing intervals typically are from about 30 to about 120 seconds and preferably from about 60 to about 90 seconds. The mold is then opened and the surface coated molded part or article can be removed from the mold cavity. The cured surface appearance coating provides excellent adhesion to the nylon based substrate.

In a preferred aspect of this invention, the in-mold coating can be used in an injection molding in-mold coating process and apparatus described in the drawings. In the drawings.

Figure 1:
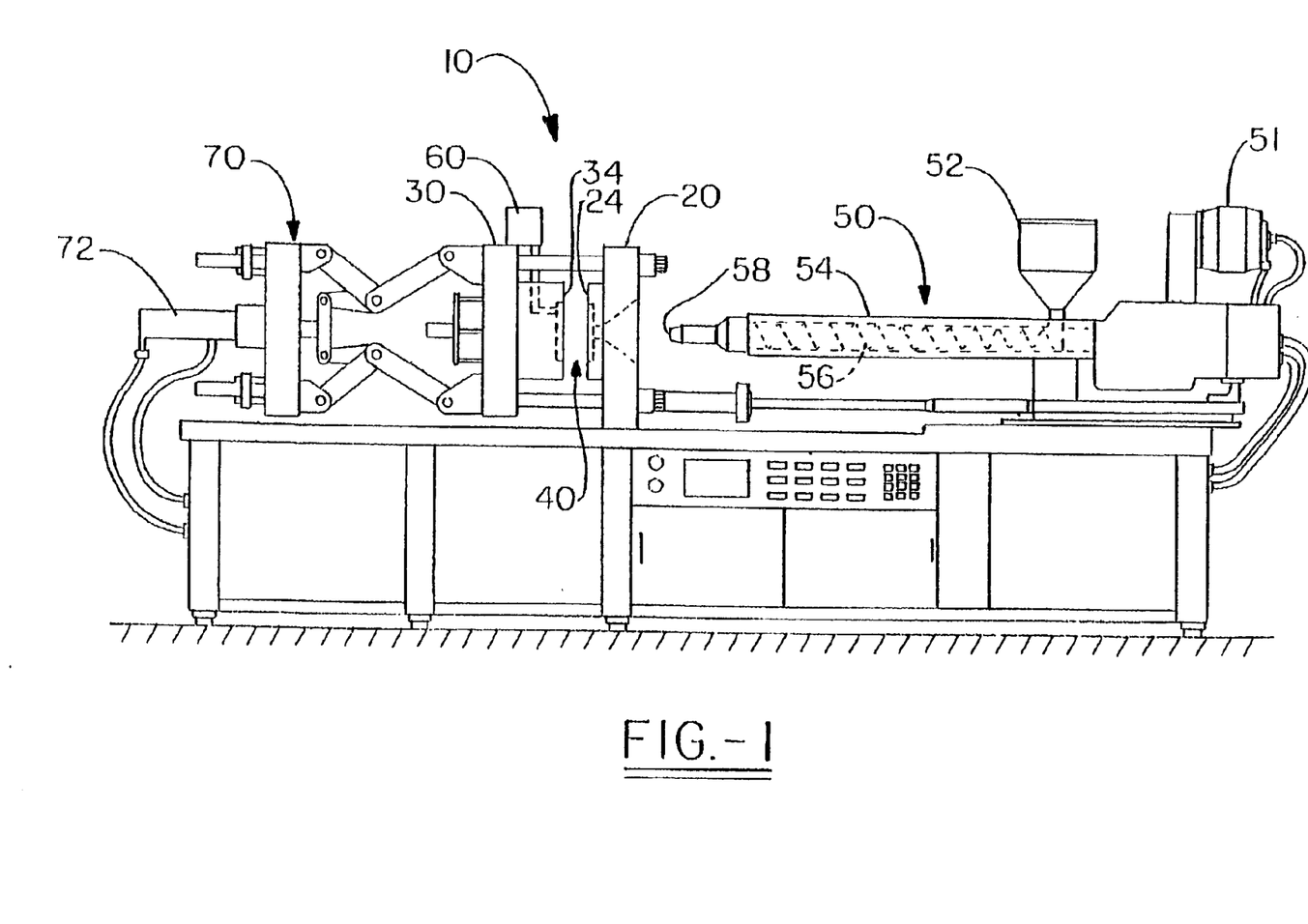
FIG. 1 is a side view of a molding apparatus suitable for practicing the method of the present invention.

Referring now to the drawings wherein like reference numerals indicate like or corresponding parts throughout the several figures, the in-mold coating process is described in conjunction with a molding apparatus generally designated 10 in FIG. 1. Molding apparatus 10 includes a first mold half 20 which preferably remains in a stationary or fixed position relative to a second moveable mold half 30. FIG. 1 shows the mold halves in an open position. The first mold half and second mold half are adapted to slidingly mate, or nest, thereby forming a mold cavity 40 therebetween as shown in at least FIG. 2. The mold halves mate along surfaces 24 and 34 (FIG. 1) when the molding apparatus is in the closed position, forming a parting line 42 (FIG. 2) therebetween.

The moveable mold half 30 reciprocates generally along a horizontal axis relative to the first or fixed mold half 20 by action of a clamping mechanism 70 with a clamp actuator 72 such as through a hydraulic, mechanical, or electrical actuator as known in the art. The clamping pressure exerted by the clamping mechanism 70 should have an operating pressure in excess of the pressures generated or exerted by the first composition injector and the second composition injector. The pressure exerted by the clamping mechanism ranges generally from about 2,000 to about 15,000, desirably from about 4,000 to about 12,000, and preferably from about 6,000 to about 10,000 pounds per square inch (psi) of mold surface.

Figure 2:
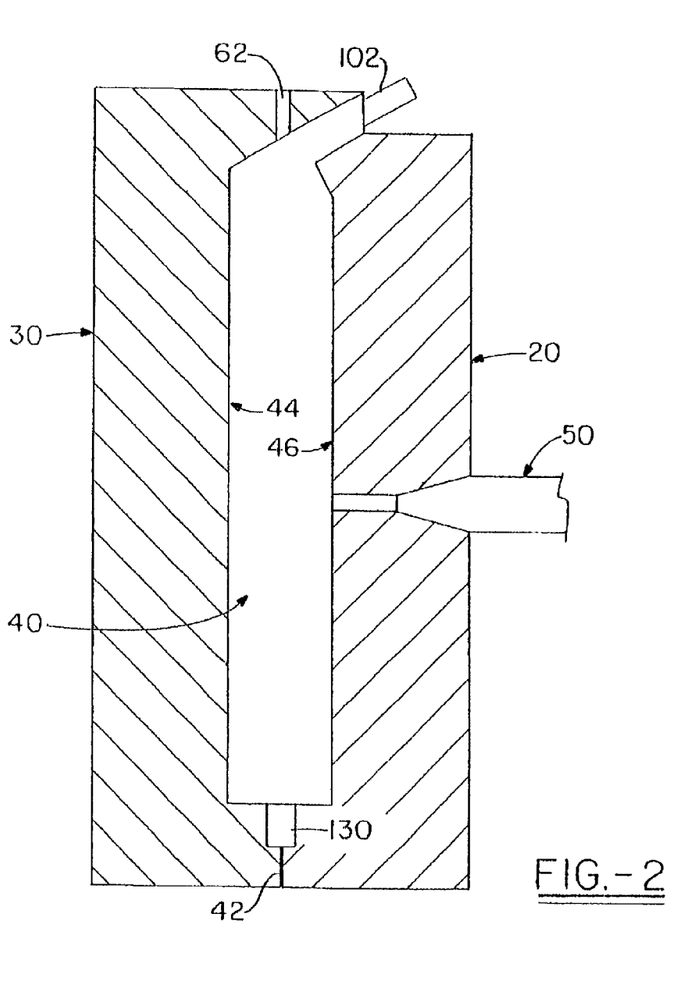
FIG. 2 is a cross section through a vertical elevation of a mold cavity.
Figure 3:
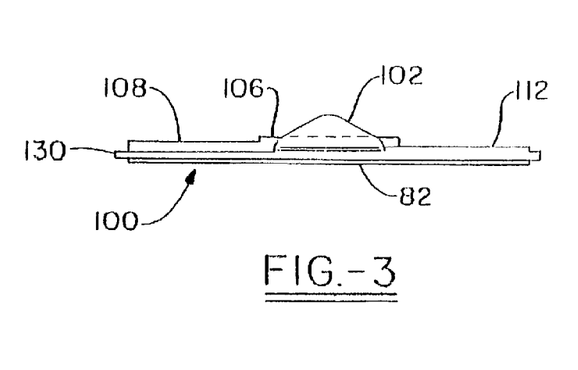
FIG. 3 is a top view of a molded substrate prior to being coated with an in-mold coating. The substrate is shown having an area of increased thickness in order to promote and/or channel in-mold coating flow.

In FIG. 2, the mold halves 20 and 30 are shown in a closed position, abutted or mated along parting line 42 illustrated at face surfaces 24 and 34 shown in FIG. 1. The mold cavity is illustrated in cross section. It is readily understood by those skilled in the art that the design of the cavity can vary greatly in size and shape according to the end product to be molded. The mold cavity generally has a first surface 44 on the first mold half, upon which a show surface of an article will be formed, and a corresponding back side or opposite second surface 46 on the second mold half. The mold cavity also contains separate orifices (47,62) to allow the first and second composition injectors to inject their respective compositions thereinto. The location of the injectors and injection orifices thereof can vary from apparatus to apparatus, and part to part, and can be based on factors such as efficiency, functionality, or desire of the mold designer.

As shown in FIG. 1, the first composition or substrate injector 50 is a typical injection molding apparatus which is well know to those of ordinary skill in the art and is capable of injecting a thermoplastic or thermosetting substrate composition, generally a resin or polymer, into the mold cavity. The first composition injector is shown in a "backed off" position, but it is readily understood that the same can be moved to a horizontal direction so that nozzle or resin outlet 58 mates with mold half 20 and can inject into mold cavity 40. For purposes of illustration only, the first composition injector in FIG. 1 is a reciprocating-screw machine wherein a first composition can be placed in hopper 52 and rotating screw 56 moves the composition through the heated extruder barrel 54, wherein the material is heated above its melting point. As the substrate material collects in the end of the barrel, the screw acts as an injection ram and forces it through the nozzle 58 into the mold cavity 40. The nozzle generally has a non-return valve at the nozzle or screw tip to prevent the backflow of material into the screw.

The first composition injector can be any apparatus capable of injecting a thermoplastic composition into the mold cavity. Suitable injection molding machines are well known in the art and are commercially available from Cincinnati Milacron, Battenfeld, Engel, Husky, Boy and others.

The method of in-mold coating of an injection molded part will now be described with reference to a typical injection molding/coating cycle. In a first step, the mold halves (20, 30) are closed and a mold cavity 40 is formed, as shown in FIG. 2. Thereafter, a clamping pressure is applied to the mold to counteract the injection pressure of the substrate composition molding material as well as the in-mold coating. The substrate composition in a melted or softened state is injected into the mold cavity from the substrate injection apparatus. After injection, the substrate composition in the mold cavity begins to "skin over" or become solidified, at least to an extent the substrate can withstand an injection pressure and/or flow pressure from the in-mold coating.

During the solidification of the substrate, cooling takes place, which is believed to cause at least a slight shrinkage in the molded substrate in the mold cavity. The shrinkage or spacing within the mold cavity may or may not be visually noticeable to the naked eye.

After the substrate composition has been injected into the mold cavity and has achieved a suitable modulus, the in-mold coating can be injected. A predetermined amount of in-mold coating is utilized to coat the molded substrate as desired. The following description of such a system is provided herein to facilitate a better understanding of the present invention. The in-mold coating apparatus 60 comprises an in-mold coating injector having a shut off pin which supplies a metered amount of a coating material. A supply pump is generally utilized to supply the in-mold coating material into a metering cylinder from a storage vessel or the like. The in-mold coating is injected from the metering cylinder into the mold cavity through passageway 62 with a pressurizing device utilizing as hydraulic, mechanical, or other pressure. When the in-mold coating apparatus is activated during injection mode, the coating material flows through passageway 62 and into the mold cavity between inner wall 44 of mold half 20 and a surface of the molded substrate. Once a predetermined amount of in-mold coating has been injected into the mold cavity, the in-mold coating apparatus 60 is deactivated thus causing the flow of coating to cease. The in-mold coating subsequently cures in the mold cavity and adheres to the substrate surface to which the same was applied. The curing can be caused by the residual heat of the substrate or mold halves, and/or by reaction between the components of the in-mold coating.

The in-mold coating is injected into the mold cavity at a pressure ranging generally from about 500 to about 5000 psi, desirably from about 1500 to about 4500 psi, and preferably from about 2000 to about 4000 psi.

The following examples further illustrate the merits and advantages of this invention, but are not intended to limit the scope of the invention.

EXAMPLE 1

In-Mold Coating Composition.

| INGREDIENT | PARTS | WT % | FUNCTION |
|---|---|---|---|
| HPMA | 8.92 | 3.61 | Monomer |
| IBOA | 58.00 | 23.46 | Monomer |
| Zinc Stearate | 4.80 | 1.94 | Mold Release |
| Calcium Stearate | 1.60 | 0.65 | Mold Release |
| Styrene | 37.00 | 14.97 | Monomer |
| Hydroquinone | 0.18 | 0.07 | Inhibitor |
| 12% Cobalt Naphthenate | 0.26 | 0.11 | Accelerator |
| HALS* | 1.50 | 0.61 | Light Stabilizer |
| UV Absorber | 3.00 | 1.21 | Light Stabilizer |
| Silica | 2.10 | 0.85 | Filler, Thixotrope |
| Talc | 10.00 | 4.05 | Filler |
| Polyester Urethane Diacrylate | 88.00 | 35.60 | Crosslinking Oligomer |
| Hexane Diol Diacrylate | 22.00 | 8.90 | Crosslinking Oligomer |
| Lubrizol AMPS 2404 | 3.30 | 1.34 | Monomer |
| Methacrylic Acid | 3.60 | 1.46 | Monomer |
| T-Butyl Peroxy Benzoate | 2.93 | 1.19 | Initiator |
| TOTAL | 247.19 | 100.00 | |

*HALS is Hindered Anion Light Stabilizer

Text for Examples A Through K

Experimental panels were molded from Ticona Celstran® PA6/6 glass-reinforced polyamide using a Cincinnati-Milacron 500 T Injection molding machine and a 12"×20"× 0.10" flat panel tool equipped with an in-mold coating injector. The coated portion of the part was 12"×20". Tool temperature was 220° F. The in-mold coating was injected at 60 seconds after mold fill commenced with the nylon (50 seconds after hold pressure began) on the molded part. The total cycle time comprised of part molding, in-mold coating injection and cure was 120 seconds. Table 1 sets forth comparative data wherein "base" is 100 parts by weight of the formulation of Example 1 with the methacrylic acid and AMPS® content thereof being varied as indicated.

TABLE 1

IMC COATING - Comparable Examples

| Ex | Base (Ex. 1) | MAA | AMPS® | Tape Adhesion GMS07IP % Retention | | | Cross-Hatch Ford B1106-01 Grade | | | Brittleness GM9506P Grade | | | Chip Resistance 0 Deg F. GM9608P Grade | | |
|---|---|---|---|---|---|---|---|---|---|---|---|---|---|---|---|
| | | | | Initial | Post-Water | Post-Heat | Initial | Post-Water | Post-Heat | Initial | Post-Water | Post-Heat | Initial | Post-Water | Post-Heat |
| A | 100.0 | 2.0 | | 0 | 0 | 0 | 10 | 10 | 10 | FAIL | FAIL | FAIL | 1 | 1 | 1 |
| B | 100.0 | 5.0 | | 0 | 0 | 0 | 10 | 10 | 10 | FAIL | FAIL | FAIL | 1 | 1 | 1 |
| C | 100.0 | | 2.0 | 10 | 0 | 0 | 10 | 10 | 10 | FAIL | FAIL | FAIL | 4 | 5 | 3 |
| D | 100.0 | | 0.8 | 100 | 5 | 96 | 1 | 7 | 0 | PASS | FAIL | PASS | 8 | 8 | 9 |
| E | 100.0 | | 1.4 | 92 | 0 | 0 | 0 | 7 | 4 | PASS | FAIL | FAIL | 8 | 8 | 8 |
| F | 100.0 | 1.5 | 0.2 | 0 | 0 | 0 | 9 | 6 | 8 | FAIL | FAIL | FAIL | 4 | 3 | 3 |
| G | 100.0 | 1.5 | 0.6 | 86 | 35 | 96 | 1 | 1 | 4 | FAIL | FAIL | PASS | 9 | 9 | 9 |
| H | 100.0 | 1.5 | 1.4 | 100 | 100 | 100 | 0 | 0 | 0 | PASS | PASS | PASS | 9 | 9 | 9 |
| I | 100.0 | 3.0 | 0.2 | 20 | 0 | 6 | 10 | 0 | 9 | FAIL | FAIL | FAIL | 8 | 8 | 8 |
| J | 100.0 | 3.0 | 0.6 | 100 | 68 | 100 | 0 | 0 | 0 | PASS | PASS | PASS | 9 | 9 | 9 |
| K | 100.0 | 3.0 | 1.4 | 100 | 84 | 100 | 0 | 3 | 0 | PASS | PASS | PASS | 9 | 7 | 9 |

Post Water = Ford ESB-M2P124 A1; 10 Day Soak at 32° C.
Post Heat = GM 4988M; 7 Days at 70° C.
For Tape Adhesion, Pass = 95 to 100% retention on part
For Cross-Hatch, Pass = Grade 2, 1 or 0
For Chip Resistance, Pass = Grade 7, 8, 9, or 10

As apparent from Table 1, the use of methacrylic acid by itself or AMPS® by itself did not yield good properties, whereas a combination of the same, generally utilizing at least about 1.5 parts by weight of acid and at least greater than 0.2 parts by weight of AMPS® per 100 parts by weight of the urethane diacrylate gave good tape adhesion, crosshatch, brittleness, and chip resistant properties.

While in accordance with the Patent Statutes, the best mode and preferred embodiments have been set forth, the scope of the invention is not limited thereto, but rather by the scope of the attached claims.

What is claimed is:

1. An in-mold coating for in-mold coating a nylon based plastic substrate, the coating comprising by weight a coreactive polymerizable composition of:
    at least about 10% of a urethane-acrylate oligomer having at least one terminal acrylate and/or methacrylate group and a number average molecular weight from about 500 to about 8000;
    at least about 0.2% of an alkylsulfonic acid functional acrylate having a terminal acrylate or methacrylate group;
    at least about 0.2% of acrylic acid and/or methacrylic acid; and the balance including at least one other coreactive polymerizable diacrylate and/or monoethylenically unsaturated monomer.

2. The in-mold coating composition of claim 1, wherein the urethane-acrylate oligomer has a molecular weight from about 500 to about 4000.

3. The in-mold coating composition of claim 1, wherein the alkylsulfonic acid functional acrylate is an alkylsulfonic acid amido acrylate and comprises from about 0.2% to about 5% of the coreactive polymerizable composition.

4. The in-mold coating composition of claim 3, wherein the alkylsulfonic acid monomer comprises from about 0.5% to about 2% of the coreactive polymerizable composition.

5. The in-mold coating composition of claim 3, wherein the alkylsulfonic acid amido acrylate is terminated with an acrylate group.

6. The in-mold coating composition of claim 3, wherein the alkylsulfonic acid amido acrylate is terminated with a methacrylate group.

7. The in-mold coating composition of claim 3, wherein the alkylsulfonic acid functional acrylate comprises 2-acrylamido-2-methyl propane sulfonic acid.

8. The in-mold coating composition of claim 1, containing from about 0.2% to about 5% acrylic acid.

9. The in-mold coating composition of claim 8, wherein the polymerizable composition contains from about 0.5% to about 2% acrylic acid.

10. The in-mold coating composition of claim 1, containing from about 0.2% to about 5% of methacrylic acid.

11. The in-mold coating composition of claim 10, wherein the polymerizable composition contains from about 0.5% to about 2% methacrylic acid.

12. The in-mold coating composition of claim 1, containing from about 10 to about 40 weight parts of a coreactive polymerizable acrylate diester Of a diol per 100 weight parts of urethane-acrylate oligomer.

13. The in-mold coating composition of claim 12, wherein the acrylate diester of a diol comprises a diacrylate terminated with acrylate end groups.

14. The in-mold coating composition of claim 12, wherein the acrylate diester of a diol comprises a dimethacrylate terminated with methacrylate end 25 groups.

15. The in-mold coating composition of claim 1, containing from about 5 to about 25 weight parts of a coreactive polymerizable hydroxyl functional acrylate or methacrylate per 100 weight parts of urethane-acrylate oligomer.

16. The in-mold coating composition of claim 1, containing from about 30 to about 80 weight parts of a coreactive polymerizable isobornyl acrylate or methacrylate per 100 weight parts of urethane-acrylate oligomer.

17. The in-mold coating composition of claim 1, containing from about 20 weight parts to about 80 weight parts of a coreactive polymerizable vinyl aromatic monomer per 100 weight parts of urethane-acrylate oligomer.

18. The in-mold coating composition of claim 17, wherein the vinyl aromatic monomer comprises styrene.

19. The in-mold coating composition of claim 1, wherein the coreactive polymerizable diacrylate is an acrylate diester of a diol and comprises from about 5% to about 20% of the polymerizable in-mold coating composition.

20. The in-mold coating composition of claim 19, wherein the acrylate diester is an ester of acrylic acid and comprises from about 5% to about 15% of the polymerizable in-mold coating composition.

21. The in-mold coating composition of claim 19, wherein the acrylate diester is an ester of methacrylic acid and comprises from about 5% to about 15% of the polymerizable in-mold coating composition.

22. The in-mold coating composition of claim 1, wherein the mono-ethylenically unsaturated monomer is an hydroxyl acrylate or methacrylate and comprises from about 1% to about 15% of the polymerizable in-mold coating composition.

23. The in-mold coating composition of claim 22, wherein the hydroxyl acrylate or methacrylate is hydroxyl-alky acrylate and comprises from about 2% at about 10% of the polymerizable in-mold coating composition.

24. The in-mold coating composition of claim 22, wherein the hydroxyl acrylate or methacrylate is hydroxy-alkyl methacrylate and comprises from about 2% to about 10% of the polymerizable in-mold coating composition.

25. The in-mold coating composition of claim 1, wherein the mono-ethylenically unsaturated monomer is isobornyl acrylate or methacrylate and comprises from about 10% to about 40% of the polymerizable in-mold coating composition.

26. The in-mold coating composition of claim 25, wherein the isobornyl acrylate or methacrylate is isobornyl acrylate and comprises from about 20% to about 30% of the polymerizable in-mold coating composition.

27. The in-mold coating composition of claim 25, wherein the isobornyl acrylate or methacrylate is isobornyl methacrylate and comprises from about 20% to about 30% of the polymerizable in-mold coating compositions.

28. The in-mold coating composition of claim 1, wherein the mono-ethylenically unsaturated monomer is vinyl aromatic monomer and comprises from about 1% to about 30% of the polymerizable in-mold coating composition.

29. The in-mold coating composition of claim 28, wherein the vinyl aromatic monomer comprises from about 10% to about 20% of the polymerizable in-mold coating composition.

30. The in-mold coating composition of claim 28, wherein the vinyl aromatic monomer comprises styrene.

31. The in-mold coating composition of claim 1, wherein the coreactive polymerizable composition comprises by weight:
    from about 10% to about 50% urethane-acrylate oligomer;
    from about 0.2% to about 5% alkylsulfonic acid amido acrylate and/or methacrylate;
    from about 0.2% to about 5% of acrylic acid and/or methacrylic acid;
    from about 5% to about 20% of an acrylate and/or methacrylate diester of a diol;

from about 1% to about 15% of an hydroxyl-alkyl acrylate or methacrylate;

from about 10% to about 40% of an isobornyl acrylate and/or methacrylate;

from about 1% to about 30% of a vinyl aromatic monomer.

32. The in-mold coating composition of claim 31, containing from about 20% to 40% urethane-acrylate oligomer.

33. The in-mold coating composition of claim 31, containing from about 5 to about 15% of the acrylate and/or methacrylate diester of a diol.

34. The in-mold coating of claim 31, containing from about 20% to about 30% of the isobornyl acrylate and/or methacrylate.

35. The in-mold coating composition of claim 31, containing from about 10% to about 20% of the vinyl aromatic monomer.

36. The in-mold coating composition of claim 31, wherein the vinyl aromatic monomer comprises styrene.

37. An in-mold coating for a thermoplastic substrate, the in-mold coating comprising:

a urethane-acrylate oligomer having at least one terminal acrylate and/or methacrylate group and a number average molecular weight of from about 500 to about 8000;

from about 0.25 to about 6 parts by weight of a sulfonic acid functional acrylate and/or methacrylate monomer; and from about 1 to about 8 parts by weight of an acrylic acid and/or methacrylic acid; and wherein said parts by weight are based upon 100 parts by weight of said urethane-acrylate oligomer.

38. The in-mold coating composition of claim 37, wherein the amount of said sulfonic acid functional monomer is from about 0.5 to about 4 parts by weight, and wherein the amount of said acrylic acid and/or methacrylic acid is from about 1.5 to about 6 parts by weight.

39. The in-mold coating composition of claim 37, further comprising from about 10 to about 40 parts by weight of an acrylate and/or methacrylate diester of a diol, from about 5 to about 25 parts by weight of a hydroxyl functional acrylate or methacrylate, from about 30 to about 80 parts by weight isobornyl acrylate and/or methacrylate, and from about 20 to about 80 parts by weight of a vinyl substituted aromatic, and wherein said parts by weight are based upon 100 parts by weight of said urethane-acrylate oligomer.

40. The in-mold coating composition of claim 38, comprising from about 15 to about 30 parts by weight of the acrylate and/or methacrylate diester of a diol, from about 5 to about 15 parts by weight of the hydroxyl functional acrylate and/or methacrylate, from about 30 to about 50 parts by weight isobornyl acrylate and/or methacrylate, and from about 30 to about 50 parts by weight of said vinyl substituted aromatic, and wherein said parts by weight are based upon 100 parts by weight of said urethane-acrylate oligomer.

41. The in-mold coating composition of claim 39, wherein said urethane-acrylate oligomer has a number average molecular weight of from about 500 to about 4000 and is derived from a polyester urethane and has 2 terminal acrylate groups, wherein said sulfonic acid functional acrylate is alkylsulfonic acid amido acrylate, wherein said acid is methacrylic acid, wherein said acrylic diester of a diol is hexamethylene diacrylate, wherein said hydroxy functional methacrylate is hydroxypropyl methacrylate, wherein said vinyl substituted aromatic is styrene, and wherein said isobornyl compound is isobornyl acrylate.

42. The in-mold coating composition of claim 40, wherein said urethane-acrylate oligomer has a number average molecular weight of from about 500 to about 4000 and is derived from a polyester urethane and has 2 terminal acrylate groups, wherein said sulfonic acid functional acrylate is alkylsulfonic acid amido acrylate, wherein said acid is methacrylic acid, wherein said acrylic diester of a diol is hexamethylene diacrylate, wherein sdaid hydroxy functional methacrylate is hydroxypropyl methacrylate, wherein said vinyl substituted aromatic is styrene, and wherein said isobornyl compound is isobornyl acrylate.

43. The in-mold coating composition of claim 37, wherein the thermoplastic substrate is nylon, or a nylon alloy blended with a thermoplastic resin, or a nylon blended with a thermoplastic resin, or combinations thereof.

44. The in-molded coating composition of claim 42, wherein the thermoplastic substrate is nylon, or a nylon alloy blended with a thermoplastic resin, or a nylon blended with a thermoplastic resin, or combinations thereof, and wherein said coating is heat cured on said substrate.

45. A molded thermoplastic laminate, comprising:

an injection molded thermoplastic substrate, a cured in-mold coating located upon at least a portion of said substrate, said in-mold coating derived from:

a urethane-acrylate oligomer having a number average molecular weight from about 500 to about 8000;

from about 0.25 to about 6 parts by weight of a sulfonic acid amido acrylate or methacrylate monomer;

from about 1 to about 8 parts by weight of an acrylic acid or methacrylic monomer;

from about 10 to about 40 parts by weight of an acrylic and/or methacrylic diester of diol;

from about 5 to about 25 parts by weight of an hydroxyl functional acrylate or methacrylate;

from about 30 to about 80 parts by weight of isobornyl acrylate and/or methacrylate; and from about 20 to about 80 parts by weight of a vinyl substitued aromatic monomer, wherein said parts by weight are based upon 100 parts by weight of said urethane-acrylate oligomer, and wherein said thermoplastic substrate is a nylon polymer or copolymer.

46. The laminate according to claim 45, wherein the urethane-acrylate oligomer has a molecular weight of from about 500 to about 4000.

47. The laminate according to claim 46, wherein the amount of said sulfonic acid amido acrylate or methacrylate monomer is from about 0.5 to about 4 parts by weight, wherein the amount of said acrylic acid or methacrylic monomer is from about 1.5 to about 6 parts by weight, wherein the amount of said acrylic and/or methacrylic diester of diol is from about 15 to about 30 parts by weight, wherein the amount of said hydroxyl functional acrylate or methacrylate is from about 5 to about 15 parts by weight, wherein the amount of said isobornyl acrylate and/or methacrylate is from about 30 to about 50 parts by weight, and wherein the amount of said vinyl substituted aromatic monomer is from about 30 about 50 parts by weight.

48. The laminate according to claim 46, wherein said urethane-acrylate is derived from a polyester urethane and has 2 terminal acrylate groups, wherein said sulfonic acid functional acrylate is alkylsulfonic acid amido acrylate, wherein said acid is methacrylic acid, wherein said acrylic diester of a diol is hexamethylene diacrylate, wherein said hydroxy functional methacrylate is hydroxypropyl methacrylate, wherein said vinyl substituted aromatic is styrene, and wherein said isobornyl compound is isobornyl acrylate.

49. The laminate according to claim 47, wherein said urethane-acrylate is derived from a polyester urethane and has 2 terminal acrylate groups; wherein said sulfonic acid functional acrylate is alkylsulfonic acid amido acrylate, wherein said acid is methacrylic acid, wherein said acrylic diester of a diol is hexamethylene diacrylate, wherein said hydroxy functional methacrylate is hydroxypropyl methacrylate, wherein said vinyl substituted aromatic is styrene, and wherein said isobornyl compound is isobornyl acrylate.

50. The laminate according to claim 45, wherein said substrate is nylon, modified nylon, a nylon alloy, or a blend of a nylon and a thermoplastic.

51. The laminate according to claim 47, wherein said substrate is a nylon, or a nylon blended with a thermoplastic.

52. The laminate according to claim 49, wherein said substrate is nylon, or nylon blended with polycarbonate or blended with polyester.

53. An in-mold coating process, comprising the steps of:
injection molding a thermoplastic substrate,
applying in-mold coating on said thermoplastic substrate, said in-mold coating comprising:
about 100 parts by weight of a urethane-acrylate oligomer having a number average molecular weight from about 500 to about 8000,
from about 0.25 to about 6 parts by weight of an alkylsulfonic acid functional amido acrylate or methacrylate,
from about 1 to about 8 parts by weight of an acrylic acid monomer,
from about 10 to about 40 parts by weight of an acrylate or methacrylate diester of a diol,
from about 5 to about 25 parts by weight of an hydroxyl functional alkyl acrylate or methacrylate,
from about 30 to about 80 parts by weight of isobornyl acrylate or methacrylate, and
from about 20 to about 80 parts by weight of a vinyl aromatic monomer;
wherein said parts by weight are based upon 100 parts by weight of said urethane-acrylate oligomer, and
polymerizing the in-mold coating to form a thermoset coating on said thermoplastic substrate.

54. The in-mold coating process of claim 53, wherein the amount of said acrylic acid and/or methacrylic acid is from about 2 to about 8 parts by weight, and wherein the amount of said alkylsulfonic acid function amido acrylate or methacrylate is from about 0.5 to about 4 parts by weight.

55. The in-mold coating process of claim 54, wherein the substrate comprises a nylon, or a nylon blended with a thermoplastic.

* * * * *